United States Patent [19]
Green et al.

[11] Patent Number: 5,116,511
[45] Date of Patent: May 26, 1992

[54] WATER TREATMENT SYSTEM AND METHOD FOR OPERATING THE SAME

[75] Inventors: Dennis H. Green, Arvada; George S. Cochetas, Golden, both of Colo.

[73] Assignee: Harrison Western Environmental Services, Inc., Wheat Ridge, Colo.

[21] Appl. No.: 659,993

[22] Filed: Feb. 22, 1991

[51] Int. Cl.⁵ .............................................. C02F 1/42
[52] U.S. Cl. .................................. 210/673; 210/677; 210/670
[58] Field of Search ............... 210/670, 673, 677, 678, 210/672, 638, 688

[56] References Cited

U.S. PATENT DOCUMENTS

| | | | |
|---|---|---|---|
| 2,754,261 | 7/1956 | Akeroyd | 210/677 |
| 2,898,185 | 8/1959 | Boyd et al. | 210/672 |
| 3,618,589 | 11/1971 | Tavani | 210/677 |
| 3,632,506 | 1/1972 | Adams et al. | 210/677 |
| 3,788,960 | 1/1974 | Patil et al. | 210/677 |
| 3,933,631 | 1/1976 | Adams | 210/677 |
| 4,432,944 | 2/1984 | Elliott | 210/672 |
| 4,705,637 | 11/1987 | Heller et al. | 210/677 |
| 4,765,909 | 8/1988 | Rourke et al. | 210/672 |
| 4,824,575 | 4/1989 | Schlossel | 210/677 |
| 5,013,449 | 8/1991 | Garcia-Huidobro et al. | 210/672 |

Primary Examiner—Stanley S. Silverman
Assistant Examiner—Cynthia L. Neisler
Attorney, Agent, or Firm—Jay K. Malkin; Klass, Law, O'Meara & Malkin

[57] ABSTRACT

A treatment system for removing metal ions from water and a method for cleaning the system. Contaminated water is passed through a plurality of columns having ion-extracting agents therein. When saturated with ions, each column is successively cleaned with primary and secondary acid solutions from separate vessels. When the primary acid is saturated with ions, it is membrane-filtered to remove ions therefrom. The secondary acid is then directed into the primary acid vessel, with the purified primary acid being routed back into the system (preferably into the second vessel) for reuse. The column is then rinsed with water, washed with an alkali solution (periodically concentrated using a water-permeable membrane), and rinsed again with water. The system preferably uses three columns, all of which are successively cleaned in the manner described above.

27 Claims, 6 Drawing Sheets

WATER TREATMENT SYSTEM AND METHOD FOR OPERATING THE SAME

BACKGROUND OF THE INVENTION

The present invention generally relates to water treatment systems, and more particularly to the operation and cleaning of a water treatment system designed to remove metal ions from water.

Industrial, mining, agricultural, and various natural processes often produce considerable amounts of waste water. This water is frequently contaminated with a variety of undesirable materials ranging from organic solvents to metal ions. The removal of metal ions from water is of particular importance, especially with respect to heavy metal ions (e.g. $Ni^{+2}$, $Cu^-$, $Co^{+2}$, $Zn^{+2}$, and the like). These metals may present considerable environmental and toxicity problems. Thus, it is important that they be removed from waste water in an efficient manner and disposed of properly.

Many chemical and physical techniques have been developed for removing metal ions from water. However, one recently-developed, highly efficient technique involves the use of polymer materials (preferably in the form of beads or other small units) having metal ion extracting agents therein. These materials are described in copending U.S. patent application Ser. No. 429,236 filed on Oct. 18, 1989 (incorporated herein by reference). This application specifically involves polymeric beads made of polysulfone, cellulose acetate, or other polymers having various metal ion extracting agents therein. Exemplary metal ion extracting agents include but are not limited to selected biomass materials (e.g. yeast, algae, molds, xanthan gum, guar gum, alginates, and mixtures thereof). Other extracting agents include but are not limited to triisooctyl amine, di-2-ethylhexyl phosphoric acid, tri-octyl methylammonium chloride, 2-hydroxy-5-dodecylbenzophenone oxime, and di-2-4,4-trimethylpentyl phosphinic acid.

Exemplary bead materials are prepared by first dissolving high-density polysulfone in an organic solvent known in the art (e.g. dimethylformamide [DMF]). Next, the desired biomass or chemical extractants are mixed with the polysulfone-DMF mixture. To facilitate this procedure, the biomass/extractants may first be adsorbed onto activated carbon.

After this step, inert metal powders (e.g. magnetite) may be combined with the mixture to increase bead density and/or impart magnetic properties to the beads. Finally, the mixture is injected through a nozzle into water, whereby spherical beads preferably ranging in size from about 1/64 to ¼ inches in diameter are immediately produced. The beads have a relatively intricate internal pore structure, with the biomass/extractants being immobilized therein. It is preferred that the beads be fabricated from mixtures containing about 75-200 g of polysulfone per liter of solvent. It is also preferred that polar solvents be used to produce the beads, and other representative solvents which may be used include dimethyl sulfoxide, tetrahydrofuran, acetone, and mixtures thereof. Other biomass materials of interest include penicillium mold and common duckweed (Lemna sp.).

The polymeric units (e.g. beads) described herein are highly efficient in removing metal ions from waste water. Specifically, metal ions in the waste water flow into the internal pore structures of the polymeric units where they are retained therein by the biomass/extractants. However, in order to efficiently use the units for large scale water treatment purposes, they must be periodically "regenerated". Regeneration (e.g. cleaning) involves the removal of metal ions from the units so that they may be reused. The present invention specifically provides a method for water treatment in which a rapid and efficient procedure is disclosed for regenerating the polymeric units. This method greatly facilitates the entire water treatment process and represents an advance in the art of water purification technology, as described in detail herein.

SUMMARY OF THE INVENTION

It is an object of the present invention to provide an efficient water treatment process.

It is another object of the invention to provide a water treatment process which is especially useful in removing metal ions from waste water.

It is another object of the invention to provide a process for removing metal ions from waste water which uses porous polymeric units (e.g. beads) having metal ion extracting agents therein.

It is a further object of the invention to provide a process for removing metal ions from waste water using porous polymeric units having metal ion extracting agents therein which are rapidly and efficiently regenerated after saturation with metal ions.

It is a still further object of the invention to provide a process for removing metal ions from waste water using porous polymeric units having metal ion extracting agents therein which are readily regenerated without substantial interruption of the water purification process.

In accordance with the foregoing objects, an efficient water treatment process for removing metal ions from waste water is disclosed. Specifically waste water containing metal ions (e.g. $Ni^{+2}$, $Cu^-$, $Co^{+2}$, $Zn^{-2}$, and the like) is passed through a first column having porous units therein preferably in the form of beads manufactured of polymeric materials in combination with one or more metal ion extracting agents. Metal ions within the water are retained within the beads. After passage through the first column, the water is then directed into a second bead-containing column in order to remove any residual metal ions not removed by the first column. The resulting purified water is then collected. However, after a period of sustained usage, the beads within the first column become saturated with metal ions and must be regenerated. To accomplish this, the flow of waste water through the first column is terminated and re-routed directly into the second column. Water passing through the second column is then passed through a third bead-containing column which had been previously regenerated in accordance with the inventive processes described herein. In a preferred embodiment, the third column is connected to the system prior to termination of the waste water flow through the first column. Thereafter, the first column is preferably drained, followed by the passage of a primary acid solution therethrough from a first acid containment vessel. The primary acid solution removes most of the bound metal ions from the beads in the first column. Next, a secondary acid solution from a separately-maintained second acid containment vessel is passed through the first column at least once. The secondary acid solution removes any metal ions which were not removed by the primary acid solution.

It should be emphasized the system of the present invention is designed to be continuous. Specifically, multiple columns will be treated using the primary acid solution and the secondary acid solution following treatment of the first column. At a specified point during the column treatment process, the primary acid solution becomes saturated with metal ions and is routed into a storage container. When this occurs, the secondary acid solution is routed from the column currently being treated into the first acid containment vessel. From a functional standpoint, the secondary acid solution (which is only minimally contaminated with metal ions) then operates in the same manner as the primary acid solution. After the primary acid solution is routed into the storage container, it is then treated in order to remove metal ions therefrom. Treatment is preferably accomplished by passage of the primary acid solution through at least one semi-permeable membrane which only allows the passage of primary acid solution therethrough and retains the metal ions. As a result, the membrane permeate consists of substantially purified primary acid solution which is subsequently routed back into the column regeneration system for use as the secondary acid solution. In a preferred embodiment, the purified primary acid solution is first routed into the second acid containment vessel, followed by the passage thereof through subsequent columns in the regeneration process. Accordingly, the circulation/regeneration of acid is repeated continuously throughout the water purification process, and minimizes the use of acid materials in the present invention.

After passage of the secondary acid solution through the first column, a supply of rinse water is preferably passed through the first column. Next, an alkali solution from an alkali storage container is passed through the first column in order to neutralize any acid materials remaining therein. Periodically during the process described herein, the alkali solution is concentrated in order to remove excess water therefrom. In a preferred embodiment, concentration is accomplished by delivering the alkali solution to a semi-permeable membrane which only allows the passage of water therethrough and retains the ionic species used to initially form the alkali solution. As a result, excess water in the alkali solution is removed as it passes through the filter, with the retentate consisting of concentrated alkali solution. The concentrated alkali solution is then passed back into the alkali storage container for reuse. Finally, an additional supply of rinse water is passed through the first column to complete the cleaning/regeneration thereof.

The regenerated first column is then operatively connected to the third column in order to receive feed water therefrom. At this point in time, three columns are all operating (in series) in the water purification stage of the system. Shortly thereafter, the second column (which had been receiving feed water) is taken out of service and cleaned in the same manner described above with respect to the first column, leaving the third and first columns in position so that the water purification process can continue. Thereafter, this cycle continues, with the three columns being successively cleaned and reintroduced into the system as described above. Using the procedure presented herein, the water purification process is allowed to continue with at least two columns being in operation at all times. Thus, the present invention represents an efficient process for removing metal ions from water while continuously maintaining operating components of the system in a clean, functional state.

These and other objects, features, and advantages of the invention will become apparent in the following Brief Description of the Drawings and Detailed Description of Preferred Embodiments.

BRIEF DESCRIPTION OF THE DRAWINGS

Illustrative and presently preferred embodiments of the invention are shown in the accompanying drawings in which.

DETAILED DESCRIPTION OF PREFERRED EMBODIMENTS

The present invention involves a highly efficient system for the removal of metal ions from water, and a method for cleaning the system continuously during the water treatment process. The system basically involves two integrated stages, namely, (1) a water purification stage, and (2) a system cleaning/regeneration stage.

Figure 1:
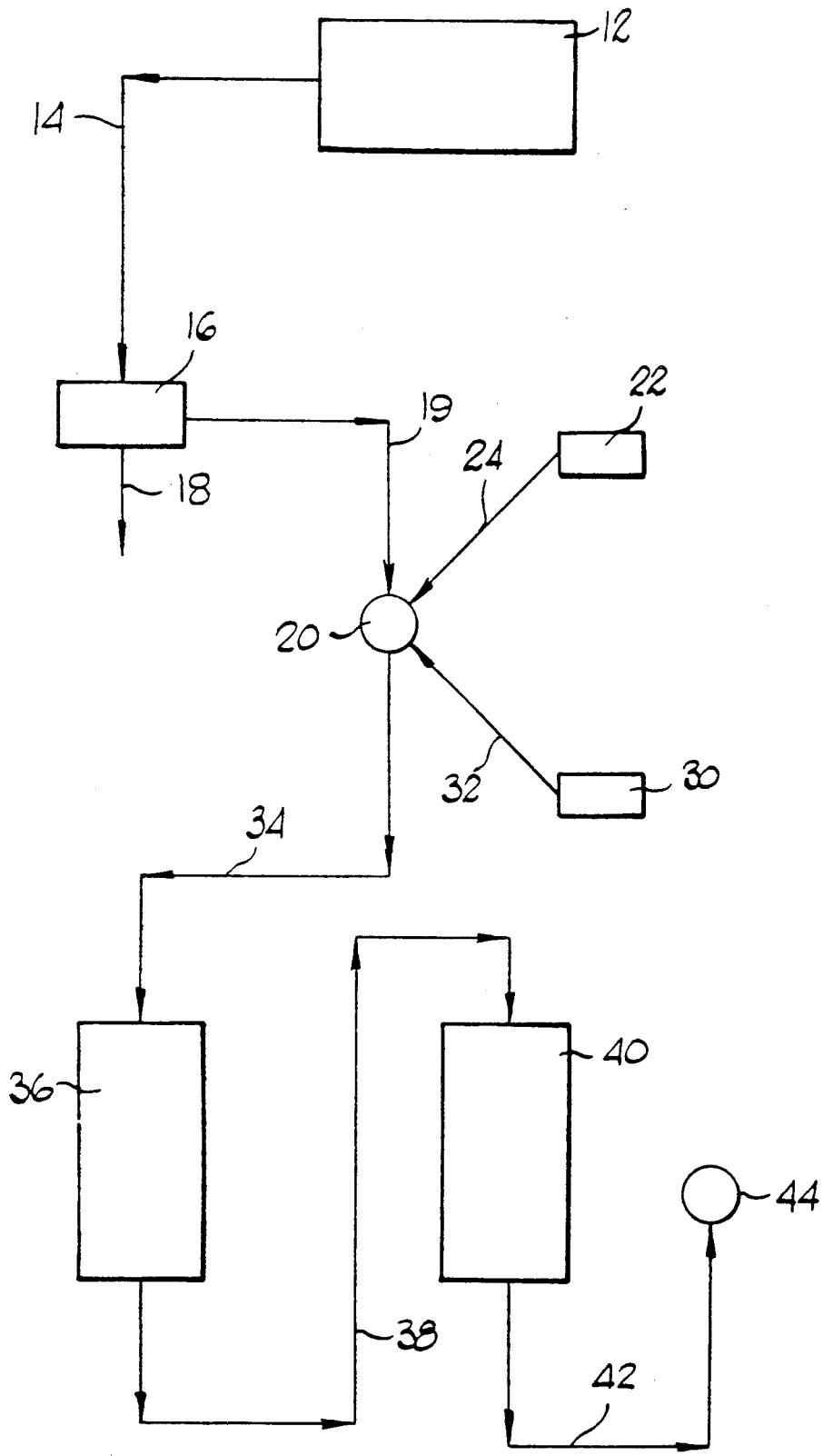
FIG. 1 is a partial schematic illustration showing how water is purified in accordance with the process of the present invention using first and second purification columns operating in series.

With reference to FIG. 1, the water purification stage is schematically illustrated. The lines and conduits to be used in this stage and in the column regeneration stage preferably consist of four inch diameter PVC conduits manufactured by Spear Manufacturing Co. of Sylmar, California. Likewise, valves used in the system may consist of standard four inch PVC motorized ball valves manufactured by Hayward Industrial Products, Inc. of Elizabeth, N.J. However, it should be noted that specific structural components (e.g. valves, lines, and the like) used to implement the processes characterized in FIGS. 1–6 may be suitably varied, and the present invention shall not be limited to only the illustrated embodiment and listed components. Furthermore, the recitation of specific part numbers and component suppliers as described herein are for example purposes only, and shall not limit the scope of the invention in any manner.

As shown in FIG. 1, feed water contaminated with metal ions (e.g. $Ni^{+2}$, $Cu^+$, $Co^{+2}$, $Zn^{+2}$ and the like) is directed from a supply 12 into the system. The supply 12 may be obtained from mining operations, manufacturing facilities, or natural processes which generate considerable amounts of metal ion by-products. In a preferred embodiment, the input flow rate of the feed water will be about 250–350 GPM (gallons per minute), with about 300 GPM being preferred.

Next, the feed water may pass via line 14 into an optional solids filter 16 which is used to remove extraneous particulate matter from the water. In a preferred embodiment, the filter 16 consists of a backwashable sand bed filter known in the art. Solid materials trapped by the filter 16 are routed out of the system for disposal through line 18.

After passage through the optional filter 16, the feed water may then pass through an optional pH adjustment zone 20 via line 19 as illustrated in FIG. 1. Tests have shown that metal ion removal from the feed water is maximized when the water pH is maintained within a range of about 3.5-7.5. To lower the pH of the feed water, an aqueous acid solution from a source 22 is routed into zone 20 via line 24 where it is mixed with the feed water. Exemplary acids for this purpose include but are not limited to sulfuric acid, nitric acid, hydrochloric acid, perchloric acid, and phosphoric acid. The acidic solutions used for this purpose preferably have a concentration level of about 15 grams/liter-30 grams/liter. In the alternative, the pH of the feed water may be raised through the addition of an aqueous alkali solution from a source 30 which is routed into zone 20 via line 32. Exemplary alkali compositions for this purpose include but are not limited to sodium hydroxide, sodium bicarbonate, and ammonia. The alkali solutions used for this purpose preferably have a concentration level of about 10 grams/liter-30 grams/liter.

Thereafter, the feed water is passed via line 34 into a first column 36 packed with polymeric units having metal ion extracting agents therein. These units are preferably in the form of individual beads. The physical and structural characteristics of the beads are described above and in copending U.S. patent application Ser. No. 429,236 filed on Oct. 18, 1989 which is incorporated herein by reference. However, the present invention shall not be limited to the use of bead materials or the specific compositions listed in U.S. application Ser. No. 429,236. Instead, polymeric units of different materials and varying external configurations (e.g. non-spherical) may also be used. However, for purposes of convenience only, further discussion of the present invention as presented herein shall refer to bead materials as the water purification agents.

An exemplary column 36 would consist of a 4000 gallon vinyl ester resin-lined steel tank manufactured by Eaton Metal Products of Denver, Colo. This tank is equipped with a hub and lateral water distribution system produced by Mattson, Inc. of Barrington, Ill. It is approximately 8 feet in diameter and 9.8 feet long. Furthermore, it is preferably equipped with an air vent system manufactured by Taco, Inc. (Model No. 409) of Cranston, R.I.

The column 36 is filled with the beads in an amount less than the capacity of the column 36. For example, if the column 36 has a capacity of 4000 gallons, then approximately 3000 gallons of beads are preferably used. The beads as described herein are commercially available from Harrison Western Environmental Services, Inc. of Lakewood, Colo.

As the feed water passes through the column 36, metal ions within the water are extracted and retained within the beads. Accordingly, the feed water passing out of the column 36 through line 38 will be nearly depleted of metal ions.

However, in order to remove any residual metal ions which remain in the feed water after passage through the column 36, the feed water is passed via line 38 into a second column 40. The second column is filled with the metal ion-extracting beads described above, and is structurally/functionally identical with the first column 36. In a preferred embodiment wherein the first column 36 and the second column 40 each have a capacity of about 4000 gallons with about 3000 gallons of beads therein, the feed water passing through each column will have an average retention time of about 10 minutes, a flow rate of about 6BV ("bed volumes")/hour, and a contact volume per cycle of about 40BV.

After passing through the second column 40, purified water passes through line 42 and is collected in a storage vessel 44. This step substantially completes the water purification stage of the process.

Figure 2:
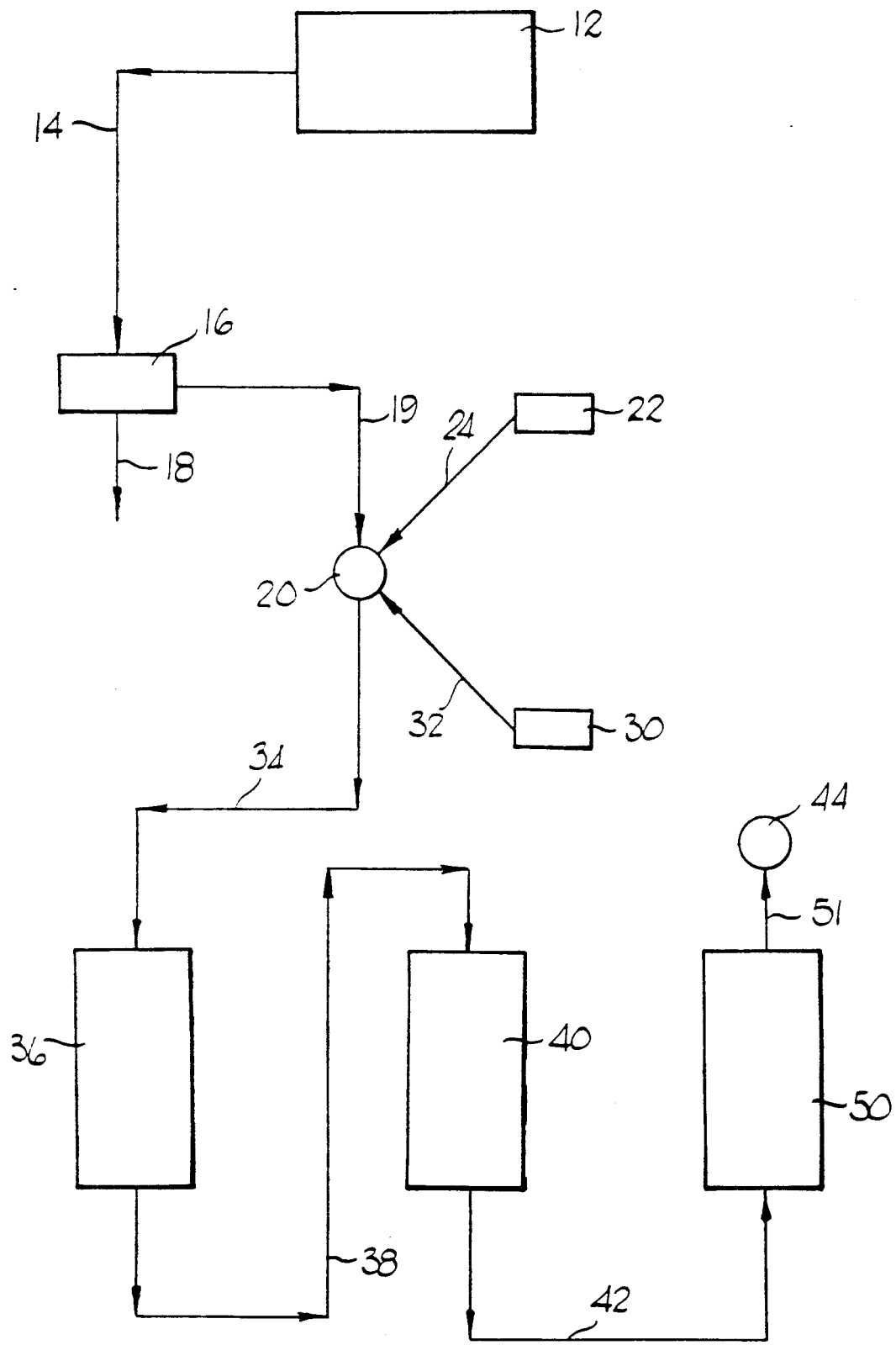
FIG. 2 is a partial schematic illustration of the process of FIG. 1 in which a third purification column is placed into service within the system prior to regeneration of the first purification column.
Figure 3:
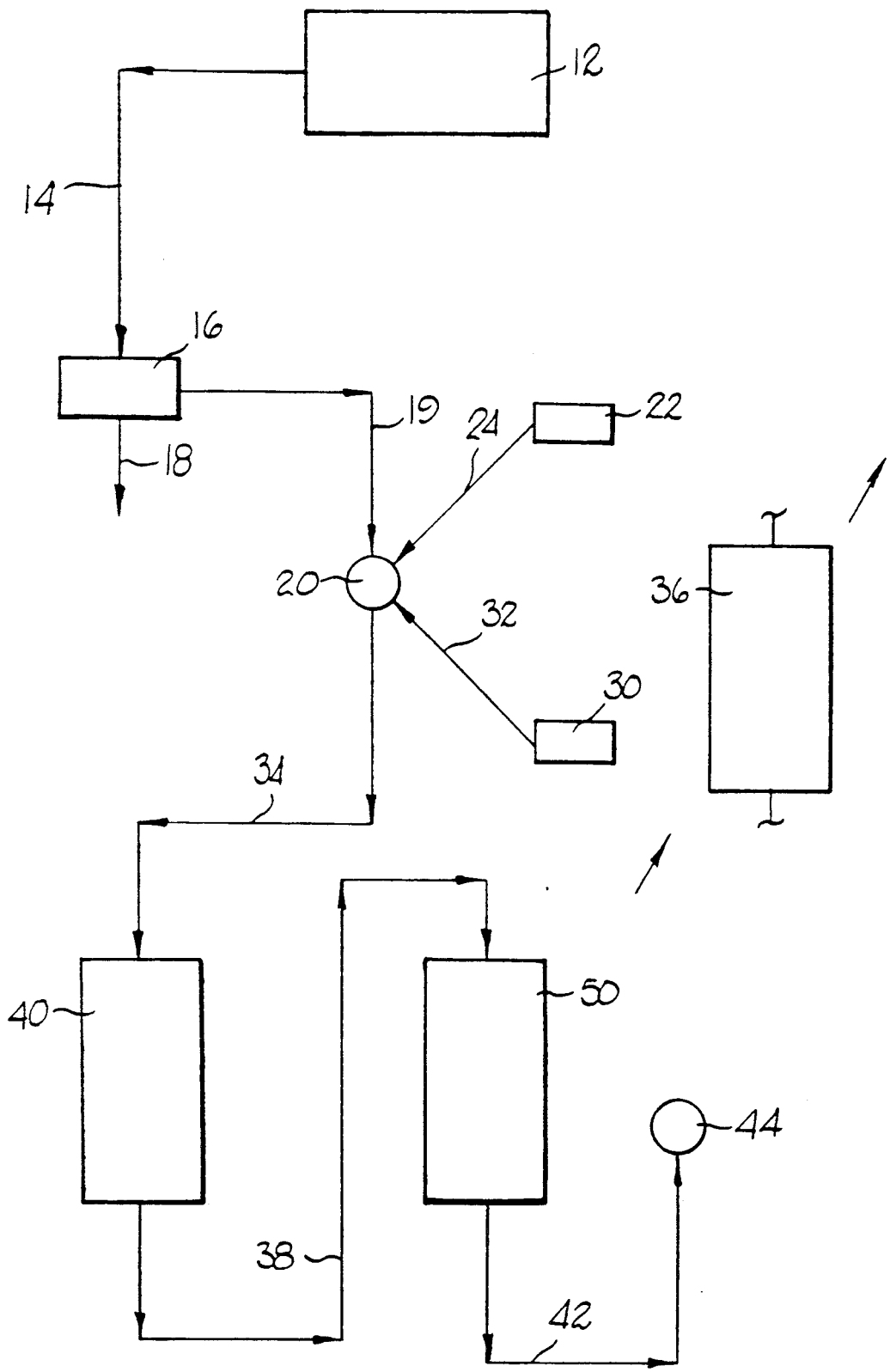
FIG. 3 is a partial schematic illustration of the process of FIG. 2 in which the first purification column in the system is taken out of service for the regeneration thereof.

The entire water purification process as described herein is designed to operate with three separate bead-filled columns in order to achieve maximum efficiency. Specifically, at least two columns are used to purify water, while a third column is being cleaned (e.g. regenerated). When the first or lead column 36 in the water purification stage shown in FIG. 1 becomes saturated with metal ions it is then operatively connected to the cleaning stage of the system. However, before this occurs, a third, previously-cleaned column having the same structural/functional characteristics as the other columns is operatively connected to the second column in the system so that three columns are operating in series to purify water (FIG. 2). Shortly thereafter, the first column is connected to the cleaning stage as described above, and the second column is advanced to the position of the first column in order to receive feed water directly from the supply 12 as illustrated in FIG. 3 and described below. Thus, the present system operates in an efficient and continuous manner by "rotating" columns between purification and cleaning stages as described in greater detail below.

In the present embodiment, when the first column 36 becomes saturated with metal ions, it is disconnected (e.g. isolated) from line 34 in order to terminate the flow of feed water through the first column 36 from the supply 12. Prior to isolation of the first column 36 from the flow of feed water thereto, a third column 50 which is identical in structure, function, and purpose to the first and second columns 36, 40 is connected to the second column 40 via line 42 (FIG. 2). Feed water flowing through the third column 50 is then passed through line 51 into storage vessel 44. Shortly thereafter (when it is determined that the first column 36 is saturated with metal ions), the first column 36 is disconnected (e.g. isolated) from the system for regeneration as noted above and illustrated in FIG. 3. A determination as to when the first column 36 becomes saturated with metal ions is obtained as a result of pilot studies conducted on the system prior to full scale operation. More specifically, a preliminary test is conducted on the first column 36 in which the contaminated water of concern is passed through the column 36 and analyzed thereafter using conventional analytical equipment/techniques known in the art. When the ionic content of the water remains unchanged after passage through the column 36, the column 36 has become "saturated". The time it took for saturation to occur at a specified flow rate is then used during actual water purification to determine when column 36 (and subsequent "lead" columns) should be taken out of service. Comparable pilot studies must be made each time a different supply of contaminated water is treated, since column saturation time will vary, depending on numerous factors including the specific metal ions in the water, the ionic concentration in the water, the water flow rate, etc.

When the first column 36 is taken out of service, the second column 40 is operatively connected to the line 34 so that feed water may pass therethrough (FIG. 3) from the supply 12. At this point, the system functions using two columns as illustrated in FIG. 3.

Figure 4:
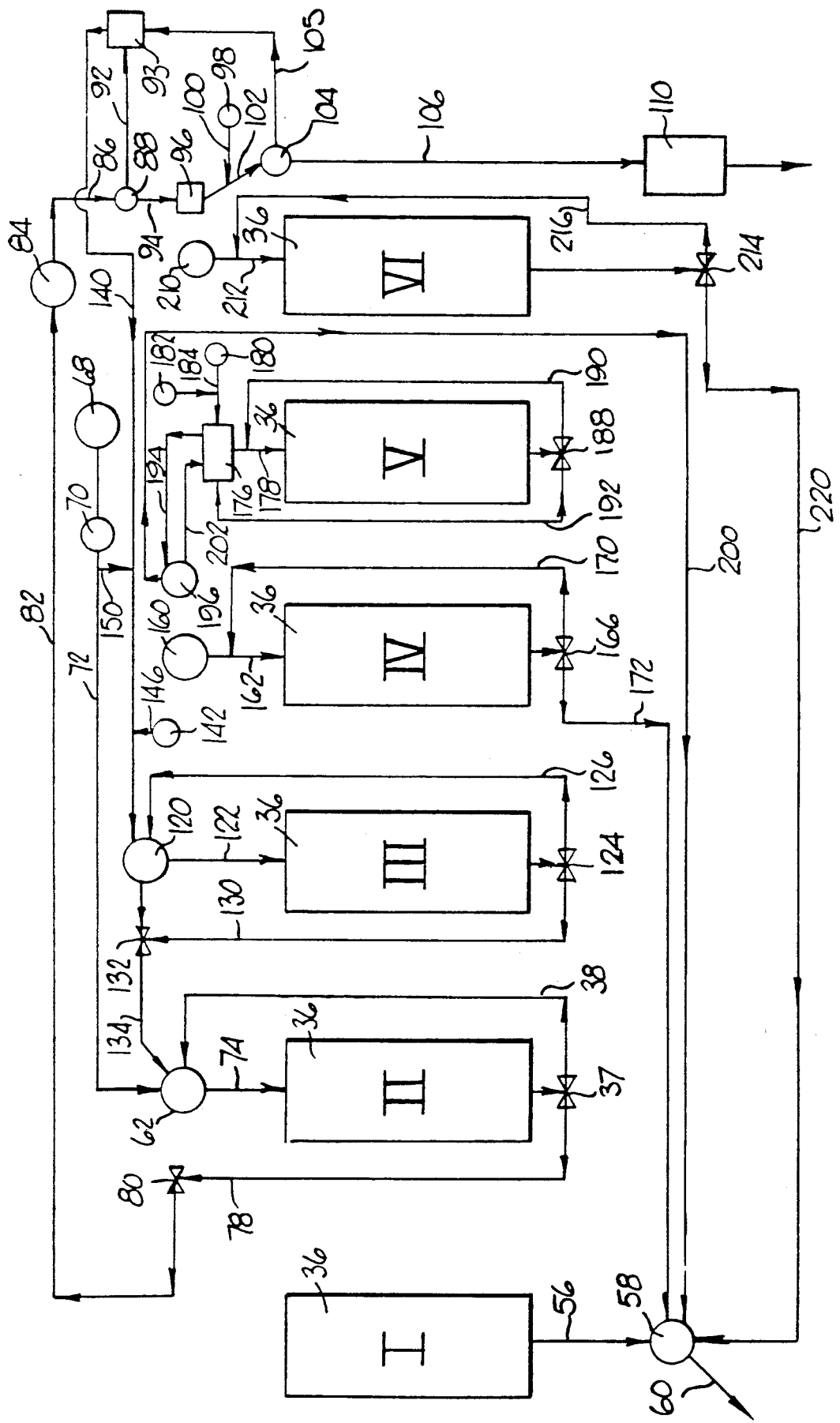
FIG. 4 is a partial schematic illustration showing regeneration of the first purification column.

The first column 36 is then operatively connected to the cleaning or regeneration stage of the system as schematically illustrated in FIG. 4. With reference to FIG. 4, the first column 36 enters Phase 1 of the regeneration process as specifically indicated in FIG. 4 by the roman numeral "I". Phase 1 (which is optional but preferred) involves operative connection of the column 36 to a drain line 56 which is connected to a remix tank 58 (preferably consisting of a 10,000 gallon steel vessel lined with vinyl ester resin and manufactured by Eaton Metal Products of Denver, Colo.). From the remix tank 58, the drainage from column 36 is routed via line 60 back into the supply 12 of feed water for subsequent re-purification.

Next, in Phase 2 ("II") of the regeneration process, the drained column 36 is connected to a first containment vessel 62 having a primary acid solution therein. The primary acid solution preferably consists of an aqueous solution of an acid selected from the group consisting of sulfuric acid, nitric acid, hydrochloric acid, perchloric acid, and phosphoric acid. In a preferred embodiment, the primary acid solution will have a concentration level of about 15 grams/liter–30 grams/liter. A specific acid solution suitable for use with present invention consists of 70 M sulfuric acid (about 30 grams/liter) which is supplied to the first containment vessel 62 from an acid storage tank 68 (330 gallon capacity manufactured by Industrial Chemicals Corp. of Arvada, Colo.). Primary acid solution from the acid storage tank 68 passes through a metering apparatus 70 known in the art and is then routed via line 72 into the first containment vessel 62. The primary acid solution subsequently passes from the first containment vessel 62 through line 74 into the column 36 at least once at a flow rate of about 250–350 GPM (300 GPM = preferred). The primary acid solution passing through the column 36 chemically strips metal ions from the beads in the column 36. If desired, the primary acid solution may be routed via valve 37 and line 38 back into the first containment vessel 62 where it is recirculated through the column 36 (via line 74) about 2–3 times. Thus, the primary acid solution from the first containment vessel 62 may preferably pass through the column 36 about 1–3 times, depending on the specific metal ions involved and other, experimentally determined factors.

At a selected point during operation of the present system, the primary acid solution becomes saturated with metal ions. This normally occurs when the metal ion concentration of the primary acid solution reaches a constant level after repeated column treatment. Again, saturation of the primary acid solution is determined by preliminary pilot tests of the same type as described above with respect to saturation of the first column 36. However, as a general rule, tests have determined that a saturation level is assumed to exist after the primary acid solution has been used to regenerate three separate bead-containing columns in the manner described above.

With continued reference to FIG. 4, if the primary acid solution has become saturated under the circumstances discussed herein, it is routed from the column 36 through valve 37 into line 78 at a flow rate substantially equal to initial flow rate of the feed water into the system from supply 12. The saturated primary acid solution is then directed through valve 80 into a line 82 which is connected to a waste acid tank 84. The waste acid tank 84 preferably has a capacity of not less than about 4000 gallons.

From the waste acid tank 84, the saturated primary acid solution is routed through a line 86 into a primary filtration system 88 at a preferred flow rate of about 7.5 GPM. The filtration system 88 preferably consists of a semi-permeable membrane having a micro-pore structure which prevents the passage of metal ions therethrough while allowing the passage of primary acid solution through the membrane. In a preferred embodiment, the membrane consists of a commercially available thin-film polymer structure known in the art for this purpose. Such a product is available as a proprietary structure from Desalination Systems, Inc. of Escondido, Calif. and sold under the designation "FGL-8040". The membrane permeate (consisting of purified primary acid solution) is routed via line 92 into a storage tank 93 (preferably manufactured of polyethylene by Plastics, Inc. of Commerce City, Colo.). The retentate from the filtration system 88 (a metal ion-rich liquor) is then directed through line 94 into a holding tank 96 of the same type as storage tank 93. At this stage, it is preferred that the pH of the material in the holding tank 96 be approximately 3.5. To accomplish this, it may be necessary to add water from a supply 98 through line 100 to the material leaving the holding tank 96. It should be noted that the supply 98 of water may be obtained from the initial purification process described above and illustrated in FIG. 1.

After water addition (if necessary), the material in holding tank 96 is passed via line 102 into a secondary filtration system 104 at a preferred flow rate of about 1 GPM. The secondary filtration system 104 preferably consists of a semi-permeable membrane of the same type used in the primary filtration system 88. The membrane permeate (again consisting mostly of purified primary acid solution) is directed via line 105 into the storage tank 93. The retentate (again consisting of a metal ion-rich liquor) is routed through line 106 into a waste tank 110 (preferably of the same type as storage tank 93) where it is subsequently disposed of.

Next, Phase 3 ("III") of the regeneration process is allowed to begin. Specifically, a secondary acid solution from a second containment vessel 120 is directed into the column 36 through line 122. The secondary acid solution consists of substantially the same materials as those used to form the primary acid solution. The secondary acid solution is allowed to pass through the column 36 at least once and preferably between about 2–3 times for the same reasons described above relative to the primary acid solution. Recirculation of the secondary acid solution occurs via valve 124 and line 126 which returns the secondary acid solution to the second containment vessel 120 as shown. It should be noted that after the regeneration of approximately three separate columns with the secondary acid solution, it is routed through valve 124 and line 130 into a valve 132. Thereafter, it is directed via line 134 into the first containment vessel 62 at substantially the same time as the primary acid solution therein is sent to the waste acid tank 84 or very shortly thereafter. In the alternative, the secondary acid solution may be held within line 130 by valve 132 and routed directly into the next column being treated when it is ready for entry into Phase 2 as described herein. Thus, the secondary acid solution (from a functional standpoint) becomes the primary acid solution. This is possible because the secondary acid solution is only minimally contaminated after the cleaning of three columns as noted above.

Next, in order to achieve maximum efficiency, the retentate (purified primary acid solution) within the storage tank 93 is routed from the tank 93 back into Phase III of the system for passage through and regeneration of subsequent columns. In a preferred embodiment, this is accomplished by routing the purified primary acid solution through line 140 back into the second containment vessel 120 as shown in FIG. 4. In an alternative embodiment, the purified primary acid solution may be held in the storage tank 93, and routed therefrom at the appropriate time directly into the next column which enters Phase 3 without passage through any intervening containment vessels. In both embodiments, it is preferred that the purified acid solution be stabilized at a pH of about 0.5. In order to raise the pH to this level, water from a source 142 is routed into line 140 through line 146 in the embodiment of FIG. 4. Conversely, in order to lower the pH, acidic materials from the acid storage tank 68 as described above are directed through metering apparatus 70 and line 150 into line 140 as desired.

As described herein, there is a constant recirculation and purification of acid materials in the system of the present invention. Specifically, primary acid solution (when saturated with metal ions or when desired) is routed into a waste acid tank 84. At substantially the same time, secondary acid solution is allowed to pass into the first containment vessel 62 in order to replace the primary acid solution. Simultaneously, the saturated primary acid solution is passed from the waste acid tank 84 through filtration systems 88, 104 as described herein, with the purified primary acid solution being routed back into the column regeneration system for reuse. This continuous cycle uses the acid materials of the present invention in a highly efficient manner, and greatly facilitates system operation.

Next, Phase 4 ("IV") of the regeneration process (which is optional but preferred) is initiated. Specifically, a preliminary supply 160 of rinse water (possibly obtained from the purification process of FIG. 1) is directed into the column 36 through line 162. The rinse water is allowed to pass therethrough at least once, and preferably about 2-3 times. Recirculation of the rinse water occurs through valve 166 and line 170. After this step is completed, the rinse water proceeds through valve 166 and line 172 into the remix tank 58 where it is routed via line 60 back into the supply 12 of feed water for subsequent re-purification.

Thereafter, Phase 5 ("V") of the regeneration process is initiated in which an aqueous alkali solution from an alkali storage tank 176 is directed into the column 36 through line 178. Exemplary alkali compositions suitable for use in the alkali solution include sodium bicarbonate, sodium hydroxide, and ammonia. It is preferred that these materials have a concentration level of about 10 grams/liter -30 grams/liter (in order to maintain a preferred pH of about 13.1). The alkali storage tank 176 is supplied by a source 180 of dry alkali material and a source 182 of water which combine and pass through line 184 into the alkali storage tank 176 (preferably consisting of a 4000 gallon fiberglass vessel with a synthetic polymer lining as manufactured by Raven Industries of Sioux Falls, S. Dak.). The alkali solution is designed to neutralize any remaining acidic materials in the column 36, and is allowed to pass therethrough at least once, and preferably about 2-3 times. Recirculation is accomplished via valve 1BB and line 190. Upon completion of this step, the alkali solution is directed into valve 188 and through line 192 back into the alkali storage tank 176. In addition, after approximately 3 separate columns have been treated with the alkali solution, it is routed from the alkali storage tank 76 via line 194 (at a preferred flow rate of about 30 GPM) into a concentrating system 196 in order to remove excess water therefrom. The concentrating system 196 preferably consists of a semi-permeable membrane which allows water to pass therethrough while preventing the passage of ionic species used to form the alkali solution. In a preferred embodiment, the membrane consists of a commercially available thin-film polymer structure having an appropriately-sized micro-pore structure which is known in the art for this purpose. Such a product is again available as a proprietary structure from Desalination Systems, Inc. of Escondido, Calif. and sold under the designation "FGL-8040". This is the same type of membrane used in filtration systems 88, 104 described above.

As noted above, the foregoing membrane allows excess water (the permeate) to pass therethrough which is directed via line 200 into the remix tank 58 where it is routed via line 60 into the supply 12 of feed water for repurification. The retentate, which consists of concentrated alkali solution, is then passed via line 202 back into alkali storage tank 176 for reuse. The pH of the recycled alkali solution may be adjusted as desired using the source 180 of alkali or the source 182 of water as previously discussed.

Finally, Phase 6 ("VI") is initiated in which an additional supply 210 of rinse water is directed via line 212 into the column 36. The water is allowed to pass through the column 36 at least once, and preferably about 2-3 times. Recirculation of the water is accomplished by the passage thereof through valve 214 and line 216. Upon completion of this step, the water is routed through valve 214 and line 220 into the remix tank 58 for subsequent purification as noted above.

Figure 5:
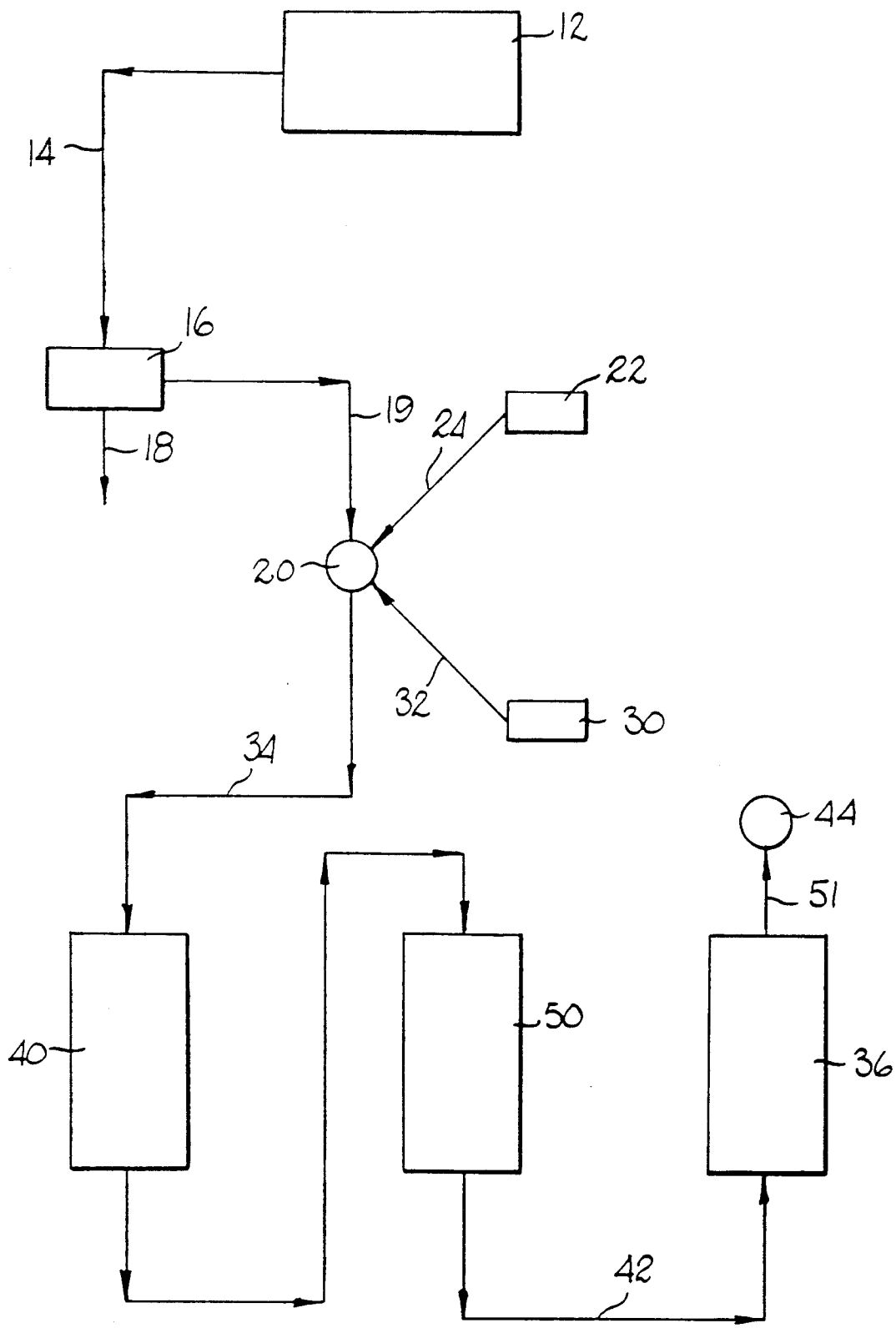
FIG. 5 is a partial schematic illustration of the process of FIG. 3 in which the regenerated first purification column is placed back in service behind the third purification column.
Figure 6:
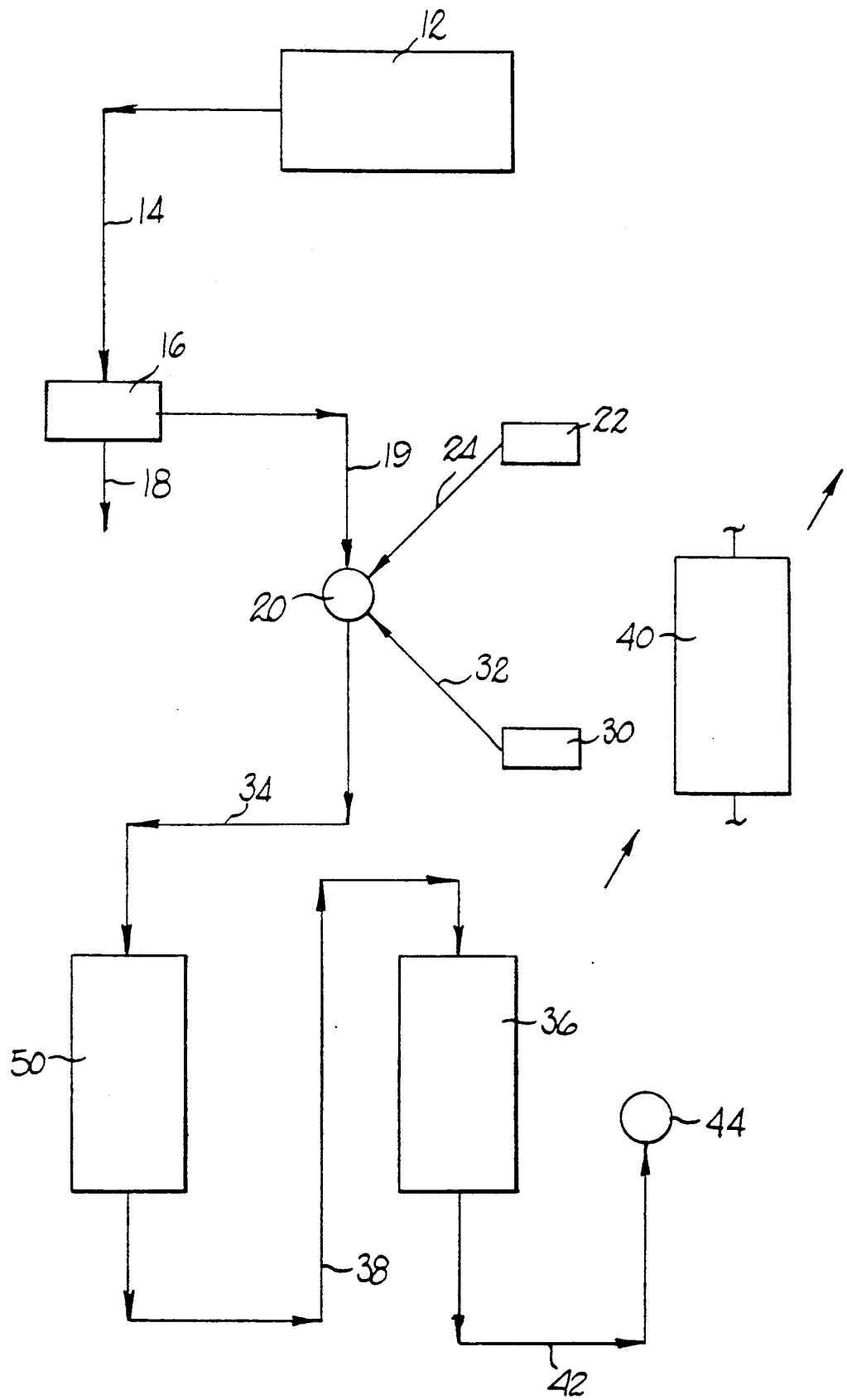
FIG. 6 is a partial schematic illustration of the process of FIG. 5 in which the second purification column in the system is taken out of service for the regeneration thereof.

At this point, the column 36 is entirely regenerated and ready for re-introduction into the water purification stage of the system. Specifically, when the column 36 is regenerated, it is disconnected (e.g. isolated) from the regeneration stage of the system. Thereafter, it is connected via line 42 to the third column 50 as illustrated in FIG. 5 in order to receive feed water therefrom. The output from the first column 36 is then passed into storage vessel 44 via line 51. Shortly thereafter, the second column 40 is disconnected (e.g. isolated) from the supply 12 of feed water which is rerouted into the third column 50 (FIG. 6). Connection of the regenerated first column 36 to the water purification stage as noted above intentionally occurs before disconnection of the second column 40 from the supply 12 of feed water. This occurs because it takes less time for regeneration of a column than it takes for a column to effectively treat contaminated water and become saturated. Thus, when the third column 36 is reintroduced into the system as shown in FIG. 5, the second column 40 has not yet completed water purification to the maximum degree.

Accordingly, until the second column 40 has completed its function, the system is actually operating with three columns as shown in FIG. 5.

After the second column 40 has become saturated with metal ions (as determined in the same manner relative to the first column 36), it is then operatively connected to the regeneration system of the invention and cleaned as noted above. This cycle repeats itself in a continuous manner, thereby cleaning all of the columns when needed while ensuring that the water purification process occurs in a continuous, uninterrupted manner. As a result, the entire procedure operates in a highly efficient, uninterrupted manner which enables the purification of substantial quantities of water in a minimal amount of time.

The following Example clearly illustrates the ability of the system to effectively purify water while cleaning the system components in a highly efficient manner:

EXAMPLE

Using the procedure described above, 120,000 gallons (40BV) of contaminated water were treated in accordance with the present invention. All of the equipment, operational parameters, and structural components were the same as indicated above. The initial feed water had the following characteristics:

TABLE 1

| Temperature | 60 degrees F. |
|---|---|
| pH | 6.5 |
| Ni ion conc. | 3.38 mg/L |
| Cu ion conc. | 0.06 mg/L |
| Co ion conc. | 0.18 mg/L |
| Zn ion conc. | 0.21 mg/L |
| Tot. Susp. Solids | 4 mg/L |

The feed water entered the purification stage (first column 36) of the system at a flow rate of 300 GPM. Passage of the feed water through a sand bed filter 16 as described herein was not necessary in view of the low initial level of suspended solids in the water. Likewise, it was not necessary to adjust the pH of the water since it fell within the 3.5-7.5 optimum range described above. The water then passed into the second column 40 for additional purification. Both the first and second columns 36, 40 were operated at a retention time of 10 minutes/column, a column flow rate of 6BV/hour, and a contact volume/cycle of 40BV. The purified water leaving the second column 40 had the following characteristics:

TABLE 2

| Temperature | 60 degrees F. |
|---|---|
| pH | 6.5 |
| Ni ion conc. | 0.023 mg/L |
| Cu ion conc. | 0.022 mg/L |
| Co ion conc. | 0.010 mg/L |
| Zn ion conc. | 0.008 mg/L |
| Tot. Susp. Solids | 4 mg/L |

After 6.66 hours the first column 36 had become "saturated" (as determined by preliminary pilot studies), and was disconnected (isolated) from the purification stage of the system and replaced with the second column 40. Prior to isolation of the first column 36 from the purification stage, the third column 50 was operatively connected to the second column 40 for the reasons described above. The first column 36 was then introduced into the cleaning/regeneration stage of the system and processed as described above. Thereafter, the first column 36 was placed back into service in the purification stage of the system with the second and third columns 40, 50 being rotated through the system and subsequently cleaned in the same manner.

After the cleaning of all three columns 36, 40, 50, the ion-saturated primary acid solution (which initially consisted of 70 molar sulfuric acid) was routed into the waste acid tank 84. The primary acid solution at this point had the following characteristics as theoretically calculated using conventional mass balance techniques:

TABLE 3

| Volume | 4000 gallons |
|---|---|
| pH | 0.54 |
| Ni ion conc. | 302.13 mg/L |
| Cu ion conc. | 3.42 mg/L |
| Co ion conc. | 15.30 mg/L |
| Zn ion conc. | 18.18 mg/L |

The ion-saturated primary acid solution was then passed through filtration systems 88, 104 of the same type described above. The permeate from the filtration system 88 had the following characteristics:

TABLE 4

| Volume | 3,600 gallons |
|---|---|
| pH | 0.54 |
| Ni ion conc. | 0.01 mg/L |
| Cu ion conc. | 0.02 mg/L |
| Co ion conc. | negligible |
| Zn ion conc. | 0.01 mg/L |

The retentate from the filtration system 88 had the following characteristics:

TABLE 5

| Volume | 400 gallons |
|---|---|
| pH | 1.1 |
| Ni ion conc. | 1007.0 mg/L |
| Cu ion conc. | 11.22 mg/L |
| Co ion conc. | 51.0 mg/L |
| Zn ion conc. | 60.51 mg/L |

The permeate from the filtration system 104 (after water addition to adjust the pH of the previous retentate to 3.5) had the following characteristics:

TABLE 6

| Volume | 900 gallons |
|---|---|
| pH | 3.5 |
| Ni ion conc. | 0.02 mg/L |
| Cu ion conc. | 0.04 mg/L |
| Co ion conc. | 0.01 mg/L |
| Zn ion conc. | 0.03 mg/L |

The final retentate from the filtration system 104 had the following characteristics:

TABLE 7

| Volume | 100 gallons |
|---|---|
| pH | 3.3 |
| Ni ion conc. | 3900.0 mg/L |
| Cu ion conc. | 36.0 mg/L |
| Co ion conc. | 204.0 mg/L |
| Zn ion conc. | 195.0 mg/L |

The information in Tables 4-7 represents theoretical data mathematically calculated based on the operational parameters of the system and physical characteristics of the membrane filters as supplied by the manufacturers thereof. This information clearly indicates that the present invention is capable of eliminating substantial amounts of metal ions entirely from the columns in the system, as well as from the acid materials used for column regeneration.

Thereafter, about 3960 gallons of permeate (purified primary acid solution) from the filtration systems 88, 104 were delivered to the second acid containment vessel 120 after the secondary acid therein was routed into the first acid containment vessel 62. The volume of the purified acid solution was raised to 4000 gallons and the pH decreased to about 0.5 through the addition of acid from the acid storage tank 68 as previously discussed. The resulting acid composition in the second acid containment vessel 120 had the following theoretically calculated characteristics:

TABLE 8

| Volume | 4000 gallons |
|---|---|
| pH | 0.51 |
| Ni ion conc. | 2.1 mg/L |
| Cu ion conc. | 0.3 mg/L |
| Co ion conc. | 0.01 mg/L |
| Zn ion conc. | 0.18 mg/L |

After the passage of this material through all three of the columns described above, it was concluded that it had the same characteristics as listed in Table 8. This indicates that Phase 2 of the present invention (primary acid stripping) was highly effective in removing substantially all of the bound metal ions from the columns in the system. This is further illustrated in Table 9 which presents a theoretically calculated analysis (using conventional mass balance techniques) of the rinse water from the first column 36 after the completion of Phase 4:

TABLE 9

| Volume | 4300 gallons |
|---|---|
| pH | 1.7 |
| Ni ion conc. | 0.01 mg/L |
| Cu ion conc. | 0.01 mg/L |
| Co ion conc. | 0.005 mg/L |
| Zn ion conc. | 0.01 mg/L |

This water contained virtually no metal ions, substantially all of which were previously removed upstream in the system.

Accordingly, the process of the present invention is highly effective in (1) purifying metal ion-contaminated water; (2) removing bound metal ions from the columns in the system; and (3) eliminating metal ions from the system for disposal. All of these items are accomplished in a rapid, continuous manner using minimal amounts of chemical reagents.

Having herein described preferred embodiments of the present invention, it is anticipated that suitable modifications may be made thereto by individuals skilled in the art within the scope of the invention. For example, the arrangement, structural design, and organization of the components (e.g. valves and lines) used to implement the process claimed herein may be suitably varied. Accordingly, the scope of the invention shall only be construed in accordance with the following claims.

The invention that is claimed is:

1. In a system for removing metal ions from contaminated water wherein a flow of contaminated water is maintained through at least one column containing a supply of a water purifying agent designed to extract metal ions from said water and retain said metal ions therein, a method for removing said metal ions from said water purifying agent comprising the steps of:

providing at least one column containing a supply of a water purifying agent therein, said water purifying agent comprising a metal ion extractant therein, said metal ion extractant being saturated with metal ions from contaminated water;

providing a first vessel containing a primary acid solution;

providing a second vessel containing a secondary acid solution, said first vessel being maintained separately from said second vessel;

passing said primary acid solution from said first vessel through said column at least once in order to remove said metal ions from said extractant;

terminating said passing of said primary acid solution from said first vessel through said column;

treating said primary acid solution after said terminating of said passing thereof through said column in order to remove said metal ions from said primary acid solution, said treating of said primary acid solution producing a purified acid solution;

passing said secondary acid solution from said second vessel through said column at least once in order to remove any of said metal ions from said extractant which were not removed by said primary acid solution; and introducing said purified acid solution back into said system for treating additional columns which subsequently become contaminated with metal ions.

2. The method of claim 1 wherein said primary acid solution and said secondary acid solution are each comprised of an acid selected from the group consisting of sulfuric acid, nitric acid, hydrochloric acid, perchloric acid, and phosphoric acid.

3. The method of claim 1 wherein said treating of said primary acid solution comprises the step of passing said primary acid solution through at least one membrane which is capable of preventing passage of said metal ions therethrough while allowing passage of said primary acid solution in order to produce said purified acid solution.

4. The method of claim 1 further comprising the step of directing said secondary acid solution into said first vessel after said passing thereof through said column.

5. The method of claim 4 wherein said introducing of said purified acid solution back into said system comprises the step of directing said purified acid solution into said second vessel after said directing of said secondary acid solution into said first vessel.

6. In a system for removing metal ions from contaminated water wherein a flow of contaminated water is maintained through at least one column containing a supply of a water purifying agent designed to extract metal ions from said water and retain said metal ions therein, a method for removing said metal ions from said water purifying agent comprising the steps of:

providing at least one column containing a supply of a water purifying agent therein, said water purifying agent comprising a metal ion extractant therein, said metal ion extractant being saturated with metal ions from contaminated water;

providing a first vessel containing a primary acid solution;

providing a second vessel containing a secondary acid solution, said first vessel being maintained separately from said second vessel;

passing said primary acid solution from said first vessel through said column at least once in order to remove said metal ions from said extractant;

terminating said passing of said primary acid solution from said first vessel through said column;

passing said secondary acid solution from said second vessel through said column at least once in order to remove any of said metal ions from said extractant which were not removed by said primary acid solution;

passing an alkali solution from an alkali storage vessel through said column at least once after said passing of said secondary acid solution therethrough;

treating said alkali solution after said passing thereof through said column so that said alkali solution may be reused to treat additional columns in said system; and passing a supply of water through said column at least once after said passing of said alkali solution therethrough.

7. The method of claim 6 further comprising the step of passing a preliminary supply of water through said column at least once after said passing of said secondary acid solution therethrough and before said passing of said alkali solution therethrough.

8. The method of claim 6 wherein said alkali solution comprises a base selected from the group consisting of sodium hydroxide, sodium bicarbonate, and ammonia.

9. The method of claim 6 wherein said treating of said alkali solution further comprises the steps of:
concentrating said alkali solution after said passing thereof through said column; and
directing said alkali solution after said concentrating thereof back into said alkali storage vessel for reuse.

10. The method of claim 9 wherein said concentrating of said alkali solution comprises the step of placing said alkali solution in contact with a membrane capable of allowing only water to pass therethrough in order to eliminate excess water from said alkali solution.

11. In a system for removing metal ions from contaminated water wherein a flow of contaminated water is maintained through at least one column containing a supply of a water purifying agent designed to extract metal ions from said water and retain said metal ions therein, a method for removing said metal ions from said water purifying agent comprising the steps of:
providing at least one column containing a supply of a water purifying agent therein, said water purifying agent comprising a metal ion extractant therein, said metal ion extractant being saturated with metal ions from contaminated water;
providing a first vessel containing a primary acid solution;
providing a second vessel containing a secondary acid solution, said first vessel being maintained separately from said second vessel;
passing said primary acid solution from said first vessel through said column at least once in order to remove said metal ions from said extractant;
terminating said passing of said primary acid solution from said first vessel through said column;
treating said primary acid solution after said terminating of said passing thereof through said column in order to remove said metal ions from said primary acid solution, said treating of said primary acid solution producing a purified acid solution, said treating comprising the step of passing said primary acid solution through at least one membrane which is capable of preventing passage of said metal ions therethrough while allowing passage of said primary acid solution in order to produce said purified acid solution;

passing said secondary acid solution from said second vessel through said column at least once in order to remove any of said metal ions from said extractant which were not removed by said primary acid solution;

directing said secondary acid solution into said first vessel after said passing thereof through said column;

directing said purified acid solution into said second vessel after said directing of said secondary acid solution into said first vessel;

passing a preliminary supply of water through said column at least once after said passing of said secondary acid solution therethrough;

passing an alkali solution from an alkali storage vessel through said column at least once after said passing of said preliminary supply of water therethrough;

concentrating said alkali solution after said passing thereof through said column, said concentrating of said alkali solution comprising the step of placing said alkali solution in contact with a membrane capable of allowing only water to pass therethrough in order to eliminate excess water from said alkali solution;

directing said alkali solution after said concentrating thereof back into said alkali storage vessel for reuse; and passing an additional supply of water through said column at least once after said passing of said alkali solution therethrough.

12. The method of claim 11 wherein said primary acid solution and said secondary acid solution are each comprised of an acid selected from the group consisting of sulfuric acid, nitric acid, hydrochloric acid, perchloric acid, and phosphoric acid.

13. The method of claim 11 wherein said alkali solution comprises a base selected from the group consisting of sodium hydroxide, sodium bicarbonate, and ammonia.

14. A method for purifying water contaminated with metal ions comprising the steps of:
providing a first column, a second column, and a third column, said first column, said second column, and said third column each containing a supply of a water purifying agent comprising a metal ion extractant therein;
passing feed water contaminated with metal ions from a supply thereof through said first column in order to remove said metal ions from said water, said metal ions being retained within said first column by said extractant;
passing said feed water through said second column after said passing thereof through said first column in order to remove any of said metal ions from said water which were not removed by said first column, said metal ions being retained within said second column by said extractant;
operatively connecting said third column to said second column in order to receive said feed water therefrom;
terminating said passing of said feed water from said supply thereof through said first column;
redirecting said feed water from said supply thereof into said second column;
providing a first vessel containing a primary acid solution;

providing a second vessel containing a secondary acid solution, said first vessel being maintained separately from said second vessel;

passing said primary acid solution from said first vessel through said first column at least once in order to remove said metal ions from said extractant;

terminating said passing of said primary acid solution from said first vessel through said first column;

passing said secondary acid solution from said second vessel through said first column at least once in order to remove any of said metal ions from said extractant which were not removed by said primary acid solution;

operatively connecting said first column to said third column after said passing of said secondary acid solution through said first column so that said first column receives said feed water from said third column;

terminating said passing of said feed water from said supply thereof through said second column; and redirecting said feed water from said supply thereof into said third column.

15. The method of claim 14 wherein said primary acid solution and said secondary acid solution are each comprised of an acid selected from the group consisting of sulfuric acid, nitric acid, hydrochloric acid, perchloric acid, and phosphoric acid.

16. The method of claim 14 further comprising the steps of:

treating said primary acid solution after said terminating of said passing thereof through said first column in order to remove said metal ions from said primary acid solution, said treating of said primary acid solution producing a purified acid solution; and introducing said purified acid solution back into said system for treating additional columns which subsequently become contaminated with metal ions.

17. The method of claim 16 wherein said treating of said primary acid solution comprises the step of passing said primary acid solution through at least one membrane which is capable of preventing passage of said metal ions therethrough while allowing passage of said primary acid solution in order to produce said purified acid solution.

18. The method of claim 16 further comprising the step of directing said secondary acid solution into said first vessel after said passing thereof through said first column.

19. The method of claim 18 wherein said introducing of said purified acid solution back into said system comprises the step of directing said purified acid solution into said second vessel after said directing of said secondary acid solution into said first vessel.

20. The method of claim 14 further comprising the steps of:

passing an alkali solution from an alkali storage vessel through said first column at least once after said passing of said secondary acid solution therethrough; and passing a supply of water through said first column at least once after said passing of said alkali solution therethrough.

21. The method of claim 20 further comprising the step of passing a preliminary supply of water through said first column at least once after said passing of said secondary acid solution therethrough and before said passing of said alkali solution therethrough.

22. The method of claim 20 wherein said alkali solution comprises a base selected from the group consisting of sodium hydroxide, sodium bicarbonate, and ammonia.

23. The method of claim 20 further comprising the steps of:

concentrating said alkali solution after said passing thereof through said first column; and directing said alkali solution after said concentrating thereof back into said alkali storage vessel for reuse.

24. The method of claim 23 wherein said concentrating of said alkali solution comprises the step of placing said alkali solution in contact with a membrane capable of allowing only water to pass therethrough in order to eliminate excess water from said alkali solution.

25. A method for purifying water contaminated with metal ions comprising the steps of:

providing a first column, a second column, and a third column, said first column, said second column, and said third column each containing a supply of a water purifying agent comprising a metal ion extractant therein;

passing feed water contaminated with metal ions from a supply thereof through said first column in order to remove said metal ions from said water, said metal ions being retained within said first column by said extractant;

passing said feed water through said second column after said passing thereof through said first column in order to remove any of said metal ions from said water which were not removed by said first column, said metal ions being retained within said second column by said extractant;

operatively connecting said third column to said second column in order to receive said feed water therefrom;

terminating said passing of said feed water from said supply thereof through said first column;

redirecting said feed water from said supply thereof into said second column;

providing a first vessel containing a primary acid solution;

providing a second vessel containing a secondary acid solution, said first vessel being maintained separately from said second vessel;

passing said primary acid solution from said first vessel through said first column at least once in order to remove said metal ions from said extractant;

terminating said passing of said primary acid solution from said first vessel through said first column;

treating said primary acid solution after said terminating of said passing thereof through said first column in order to remove said metal ions from said primary acid solution, said treating of said primary acid solution producing a purified acid solution, said treating comprising the step of passing said primary acid solution through at least one membrane which is capable of preventing passage of said metal ions therethrough while allowing passage of said primary acid solution in order to produce said purified acid solution;

passing said secondary acid solution from said second vessel through said first column at least once in order to remove any of said metal ions from said extractant which were not removed by said primary acid solution;

directing said secondary acid solution into said first vessel after said passing thereof through said first column;

directing said purified acid solution into said second vessel after said directing of said secondary acid solution into said first vessel;

passing a preliminary supply of water through said first column at least once after said passing of said secondary acid solution from said second vessel through said first column;

passing an alkali solution from an alkali storage vessel through said first column at least once after said passing of said preliminary supply of water therethrough;

concentrating said alkali solution after said passing thereof through said first column, said concentrating of said alkali solution comprising the step of placing said alkali solution in contact with a membrane capable of allowing only water to pass therethrough in order to eliminate excess water from said alkali solution;

directing said alkali solution after said concentrating thereof back into said alkali storage vessel for reuse;

passing an additional supply of water through said first column at least once after said passing of said alkali solution therethrough;

operatively connecting said first column to said third column after said passing of said additional supply of water through said first column so that said first column receives said feed water from said third column;

terminating said passing of said feed water from said supply thereof through said second column; and redirecting said feed water from said supply thereof into said third column.

26. The method of claim 25 wherein said primary acid solution and said secondary acid solution are each comprised of an acid selected from the group consisting of sulfuric acid, nitric acid, hydrochloric acid, perchloric acid, and phosphoric acid.

27. The method of claim 25 wherein said alkali solution comprises a base selected from the group consisting of sodium hydroxide, sodium bicarbonate, and ammonia.

* * * * *